US007965865B2

(12) United States Patent
Hampapur et al.

(10) Patent No.: US 7,965,865 B2
(45) Date of Patent: Jun. 21, 2011

(54) METHOD, SYSTEM, AND PROGRAM PRODUCT FOR PRESENTING ELECTRONIC SURVEILLANCE DATA

(75) Inventors: Arun Hampapur, Norwalk, CT (US); Andrew W. Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/756,012

(22) Filed: May 31, 2007

(65) Prior Publication Data

US 2008/0298693 A1 Dec. 4, 2008

(51) Int. Cl.
*G06K 9/00* (2006.01)
*H04N 7/18* (2006.01)

(52) U.S. Cl. ........................................ 382/103; 348/143

(58) Field of Classification Search .................. 382/103, 382/107, 236; 348/42, 50, 49, 143, 152, 348/153, 180, 416, 137, 139, 155, 159, 169–172, 348/187, 237, 239, 208.6, 240.1, 240.2; 342/20, 32, 37

See application file for complete search history.

(56) References Cited

U.S. PATENT DOCUMENTS

| | | | | |
|---|---|---|---|---|
| 6,337,710 | B1 * | 1/2002 | Watkins | 348/180 |
| 6,947,073 | B1 * | 9/2005 | Seal | 348/169 |
| 7,466,336 | B2 * | 12/2008 | Regan et al. | 348/50 |
| 7,522,186 | B2 * | 4/2009 | Arpa et al. | 348/153 |
| 2002/0054211 | A1 | 5/2002 | Edelson et al. | |
| 2003/0072492 | A1 | 4/2003 | Sugimura et al. | |

* cited by examiner

*Primary Examiner* — Abolfazl Tabatabai

(74) *Attorney, Agent, or Firm* — Anna L. Linne; Hoffman Warnick LLC

(57) ABSTRACT

The invention provides a method, system, and program product for presenting electronic surveillance data. One method according to the invention includes identifying a point to be surveyed; establishing a schedule at which the point will be surveyed; capturing a first image of the point; storing the first image; capturing a second image of the point; storing the second image; highlighting a difference between the first and second images; and presenting the first and second images to a user.

17 Claims, 8 Drawing Sheets

METHOD, SYSTEM, AND PROGRAM PRODUCT FOR PRESENTING ELECTRONIC SURVEILLANCE DATA

FIELD OF THE INVENTION

The invention relates generally to surveillance, and more particularly, to a method, system, and program product for presenting electronic surveillance data.

BACKGROUND OF THE INVENTION

The ability to monitor an area is necessary in many fields. Retail businesses may wish to monitor their showrooms during or after business hours to identify shoplifting, shortages of goods, or hazardous conditions. Other sites may require monitoring for general security purposes.

Typically, such monitoring is accomplished using video surveillance systems. One drawback to such systems is the large amount of video data collected, which may require a great deal of time to review in order to identify events of interest. Another drawback is the significant expense associated with the system itself, which may include a number of video cameras, and with the storage of the video data collected.

Accordingly, there exists a need in the art to overcome the deficiencies and limitations described hereinabove.

SUMMARY OF THE INVENTION

The invention provides a method, system, and program product for presenting electronic surveillance data. One method according to the invention includes identifying a point to be surveyed; establishing a schedule at which the point will be surveyed; determining whether an image-capturing device is in use; in the case that the image-capturing device is not in use, capturing a first image of the point; storing the first image; capturing a second image of the point; storing the second image; highlighting a difference between the first and second images; and presenting the first and second images to a user.

A first aspect of the invention provides a method of presenting electronic surveillance data comprising: identifying a point to be surveyed; establishing a schedule at which the point will be surveyed; capturing a first image of the point; storing the first image; and presenting the first image to a user.

A second aspect of the invention provides a system for presenting electronic surveillance data comprising: a system for identifying points to be surveyed; a system for establishing a schedule at which the points will be surveyed; a system for capturing at least one image of a first point; a system for storing the at least one captured image; and a system for presenting the at least one captured image to a user.

A third aspect of the invention provides a program product stored on a computer-readable medium, which when executed, presents electronic surveillance data, the program product comprising: program code for identifying a point to be surveyed; program code for establishing a schedule at which the point will be surveyed; program code for capturing a first image of the point; program code for storing the first image; and program code for presenting the first image to a user.

A fourth aspect of the invention provides a method for deploying an application for presenting electronic surveillance data, comprising: providing a computer infrastructure being operable to: identify a point to be surveyed; establish a schedule at which the point will be surveyed; capture a first image of the point; store the first image; and present the first image to a user.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a method, system, and program product for presenting electronic surveillance data.

Figure 1:
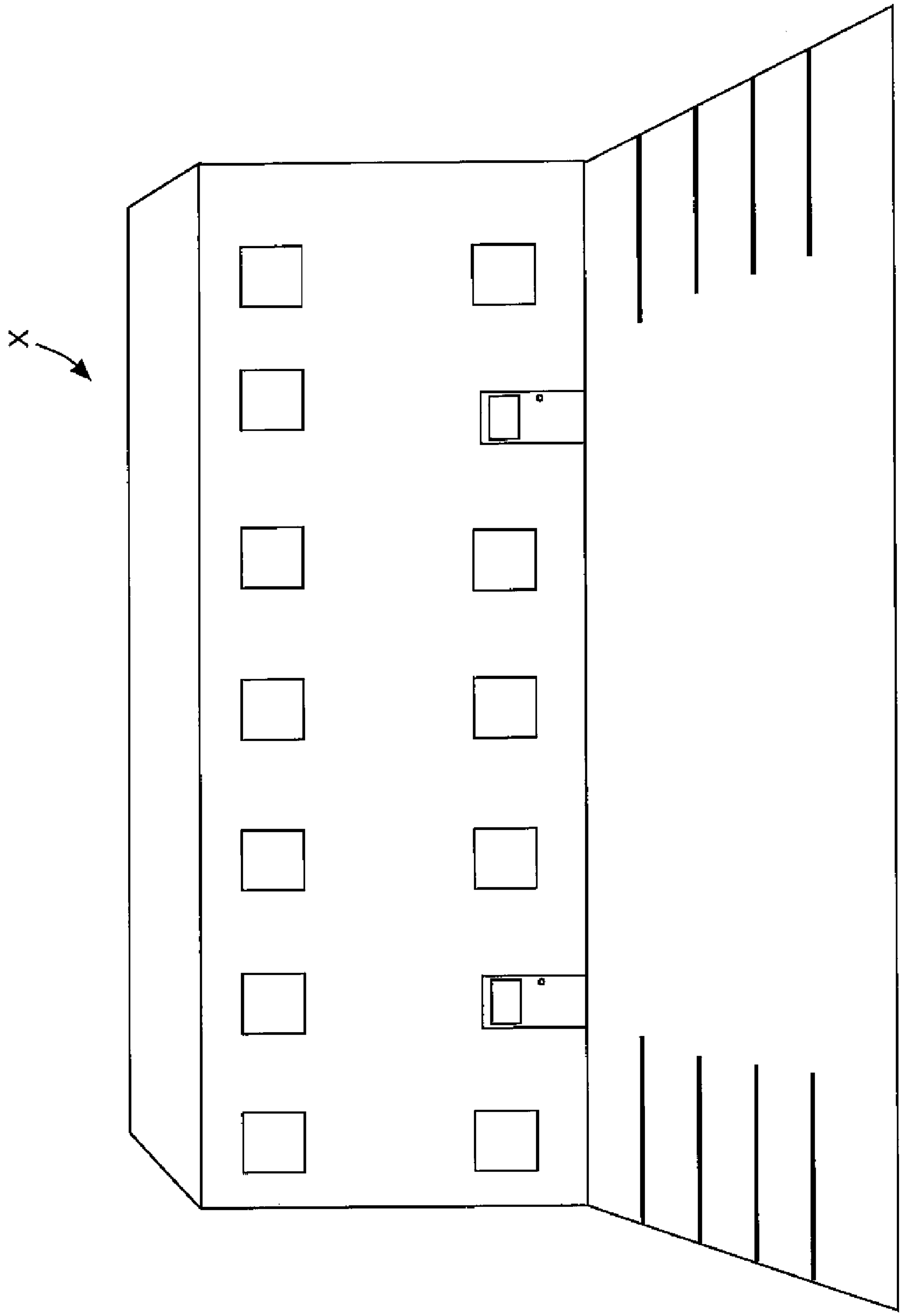
FIG. 1 shows a diagram of an area to be surveyed.
Figure 2:
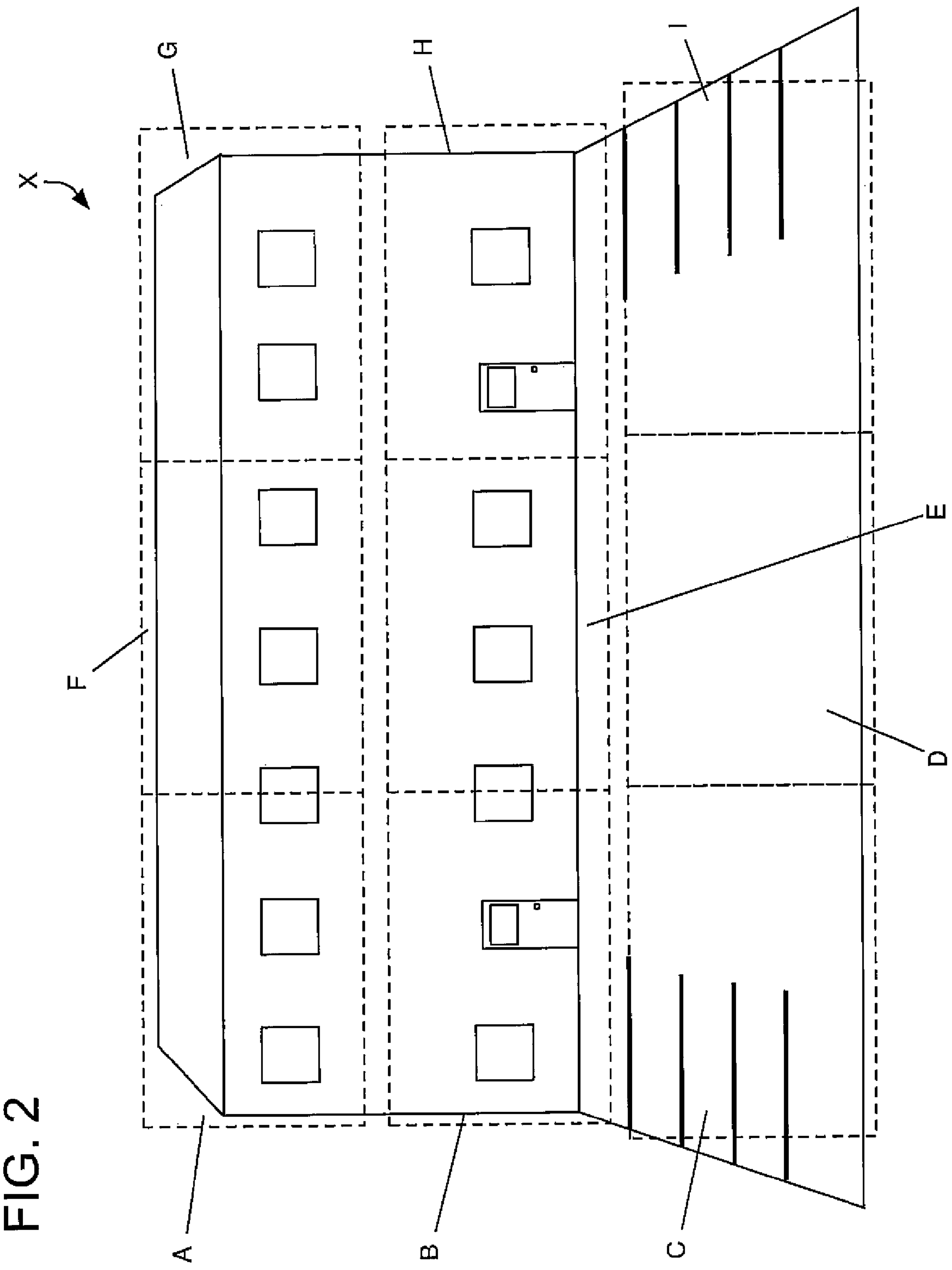
FIG. 2 shows the area of FIG. 1 with camera fields of view superimposed.

Referring now to the drawings, FIG. 1 shows an area X to be surveyed. FIG. 2 shows area X with a plurality of fields of view A-I that may be monitored using a single pan-tilt-zoom (PTZ) camera. That is, while the camera's field of view is limited to one of the fields of view at a time, the camera is capable of surveying a total area at least as large as that shown by fields of view A-I.

According to one embodiment of the invention, one or more points in area X are identified for surveillance. For example, still referring to FIG. 2, it may be desirable to survey the doors shown in fields of view B and H. Alternatively, each field of view A-I may be identified for surveillance.

Figure 3:
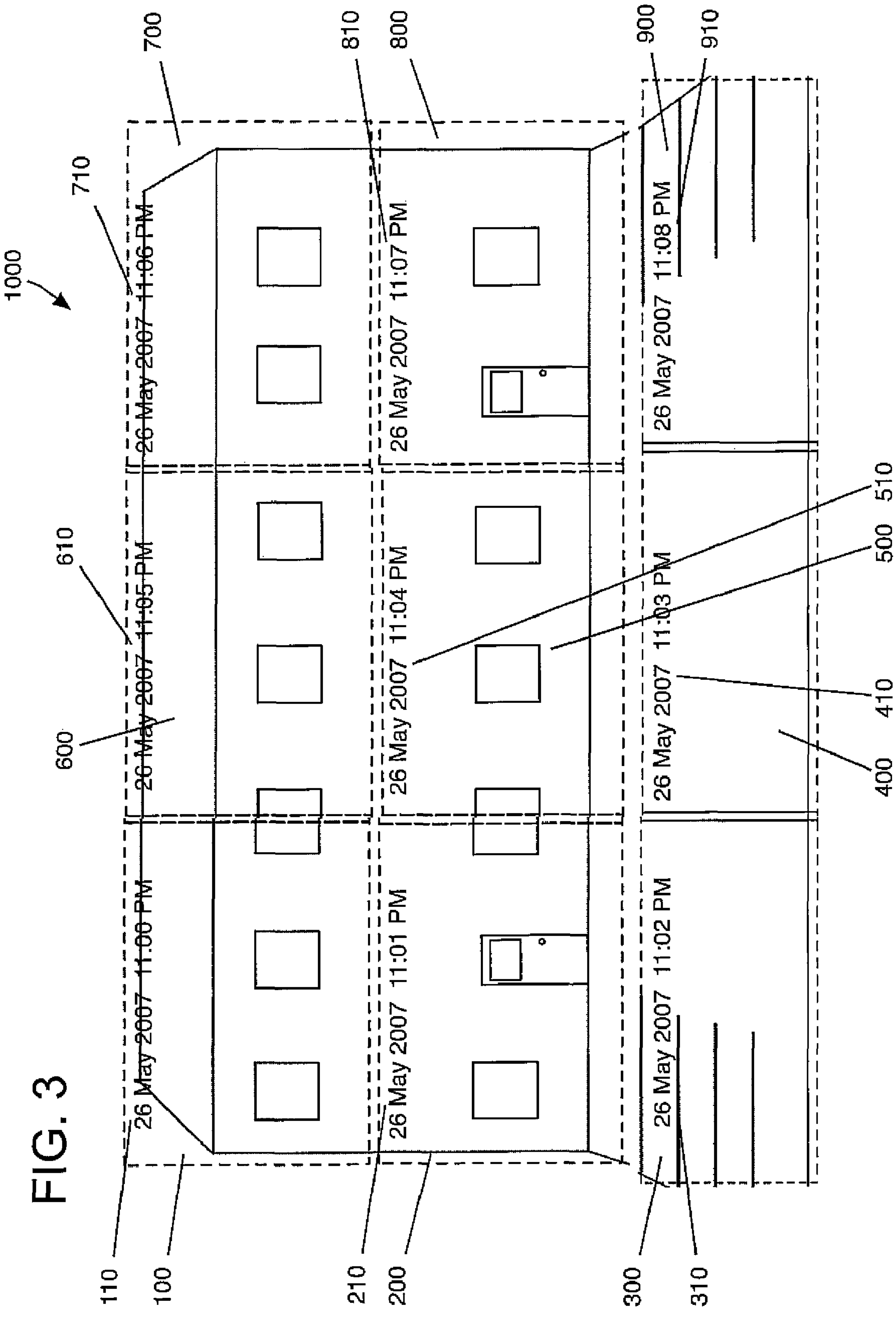
FIG. 3 shows a mosaic of captured images of the area of FIG. 1.

Once one or more points in area X are identified, a schedule for surveying the point(s) is established. For example, each field of view A-I may be scheduled for surveillance every ten minutes (e.g., surveying field of view A, followed by field of view B one minute later, field of view C one minute after that, etc., resurveying field of view A ten minutes after it was first surveyed). FIG. 3 shows a mosaic 1000 of images 100-900 of area X (FIGS. 1-2) collected according to such a schedule. Each image may include a date and/or time stamp 110-910 or similar identifier.

In other embodiments, images may be collected much more quickly (e.g., within several seconds). This permits the use of the camera for other purposes, such as live monitoring by a user, when the camera is not being used to collect prescheduled images. In such an embodiment, it may be unnecessary to include a date and/or time stamp with each image. Rather, a date and/or time stamp may be included with the mosaic as a whole.

One advantage of a mosaic such as that shown in FIG. 3 is that the file size is much smaller than an equivalent video sequence. This facilitates not only less expensive storage of surveillance data, but also makes other presentation mediums more feasible. For example, a mosaic such as that shown in FIG. 3 could be automatically posted to a website where it may be remotely monitored by a user. Alternatively, such a mosaic may be electronically transmitted (e.g., by electronic mail) directly to one or more individuals.

Another advantage of such a mosaic is the greatly decreased time required for a user to review the surveillance data it contains. That is, a summary of the state of an entire area (e.g., retail space, parking lot, warehouse, etc.) may be very quickly reviewed. A user may spend as few as one or two seconds reviewing mosaic 1000. Reviewing an equivalent video sequence would require a considerably longer period.

Figure 4:
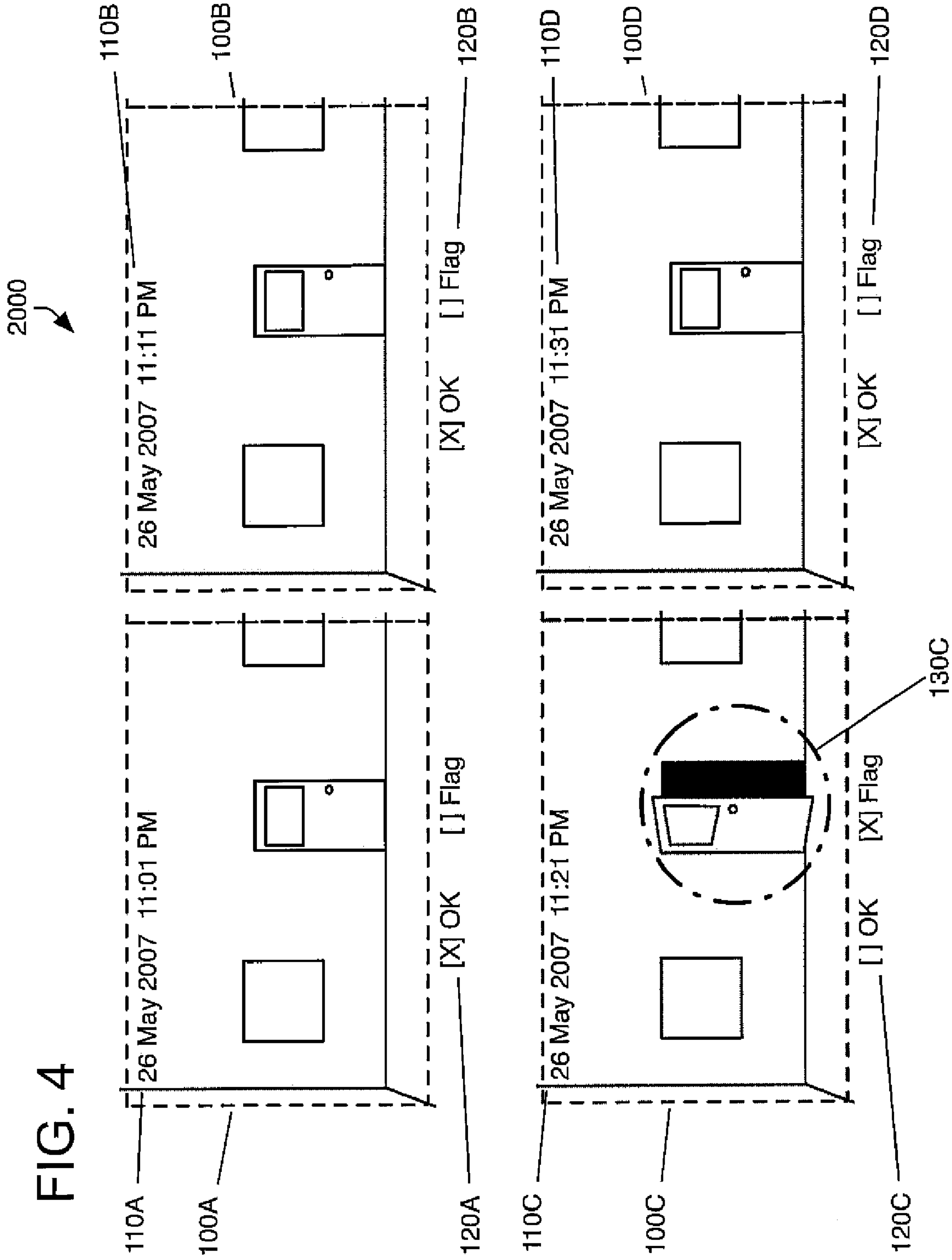
FIG. 4 shows an image sequence of captured images of one point of the area of FIG. 1.

FIG. 4 shows an alternative format for presenting surveillance data according to the invention. Image sequence 2000 includes images 100A-D collected of the same point, in this case the door in field of view B (FIG. 2). As can be seen, image sequence 2000 permits a user to immediately recognize that the door was closed at 11:01 PM (image 100A) and 11:11 PM (image 100B), open at 11:21 PM (image 100C), and closed again at 11:31 PM (image 100D). This may prompt the user to review images collected from other portions of the area being surveyed.

Images 100A-D may be presented in other ways. For example, rather than presenting the images side-by-side, they may be presented one at a time in sequential order. Doing this assists the user in observing differences between the images.

While shown in FIG. 4 as comprising images 100A-D of a field of view (B in FIG. 2), it should be understood that more detailed images may also be captured. For example, a PTZ camera or a high-resolution camera with digital zoom may be zoomed to a smaller area within field of view B (FIG. 2) to provide a more detailed view of a portion of field of view B. In FIG. 4, this could include, for example, a detailed image of the door to show its lock or some other feature. These images may be presented together as a summarization of the status of many parts of a scene. In some embodiments, only predetermined areas of interest of any given image may need to be displayed.

In some embodiments, a system according to the invention may include computer software for identifying particular features within an image, such as people. That is, an image collected according to the invention may be analyzed with computer software to determine whether the image contains people. This may be useful, for example, in counting the number of persons in an area or the number of persons entering or exiting a particular point in an area.

Such an embodiment may also be useful in monitoring an area in which access is restricted to particular individuals or during certain periods. In the case that access is restricted to particular individuals, an image may be further analyzed (e.g., with facial recognition software) to uniquely identify any persons determined to be in an image.

Images within image sequence 2000 may include an annotation area 120A-D, allowing a user to mark individual images upon reviewing the images. As shown in FIG. 4, each image 100A-D includes a pair of check boxes, permitting the user to mark the image as either "OK" or "Flag." In some cases, a user may be required to somehow annotate the images to confirm that the images were, in fact, reviewed.

Figure 5:
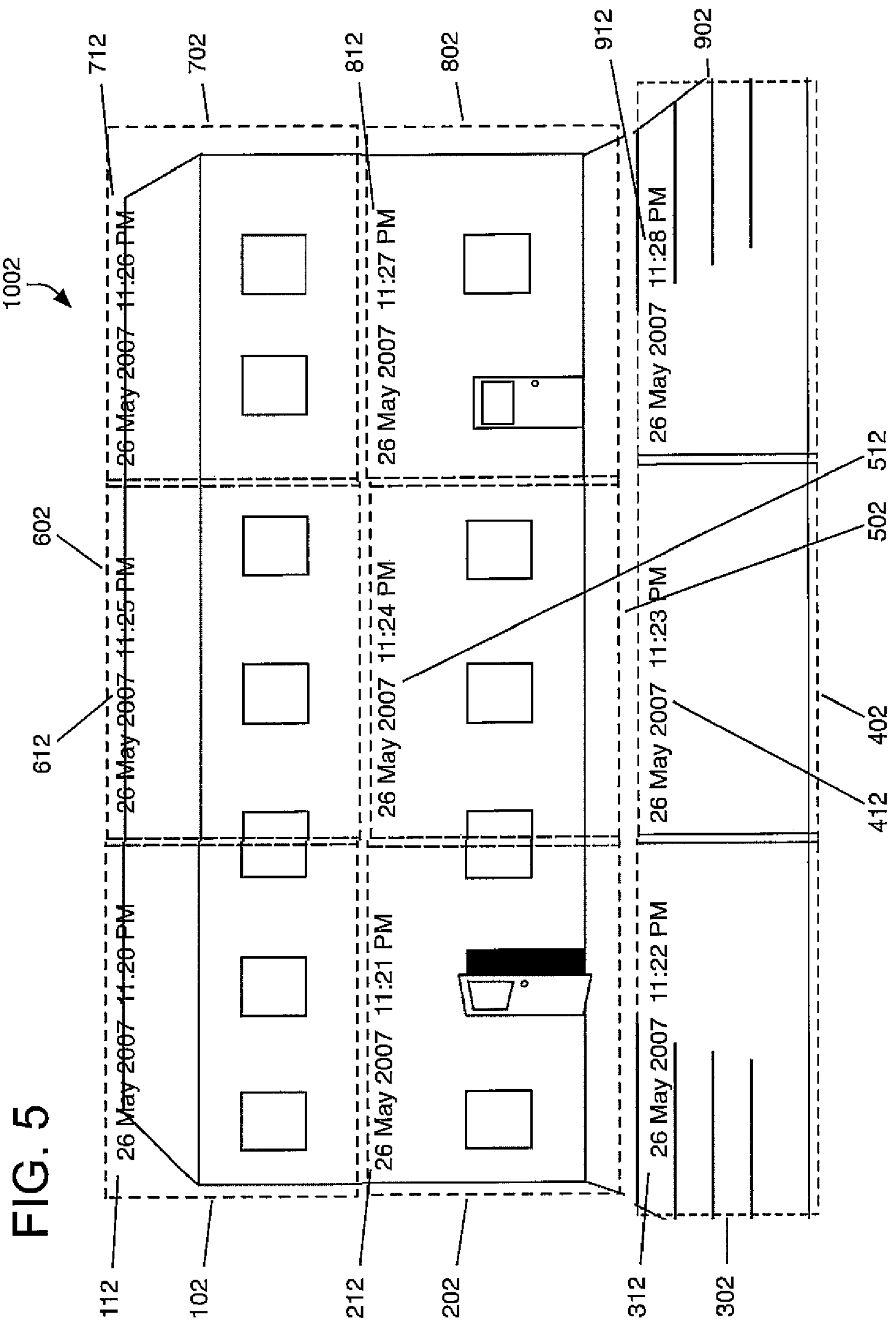
FIG. 5 shows another mosaic of captured images of the area of FIG. 1.

FIG. 5 shows a mosaic 1002 including the image corresponding to image 100C of FIG. 4. Such a mosaic may be presented in place of or in addition to the image sequence 2000 of FIG. 4.

In some embodiments of the invention, image analysis software may be employed to compare two or more images of the same point being surveyed and any differences between the images highlighted before the images are presented to a user. For example, referring again to FIG. 4, image analysis software may be employed to compare images 100A-D. Such software would identify image 100C as different than images 100A, 100B, and 100D, and mark the portion of image 100C that differs with a marker of some sort, such as circle 130C. Such analyses may be performed automatically and/or limited to the identification of pre-defined states (e.g., door is open or closed, lock is locked or unlocked, etc.).

Figure 6:
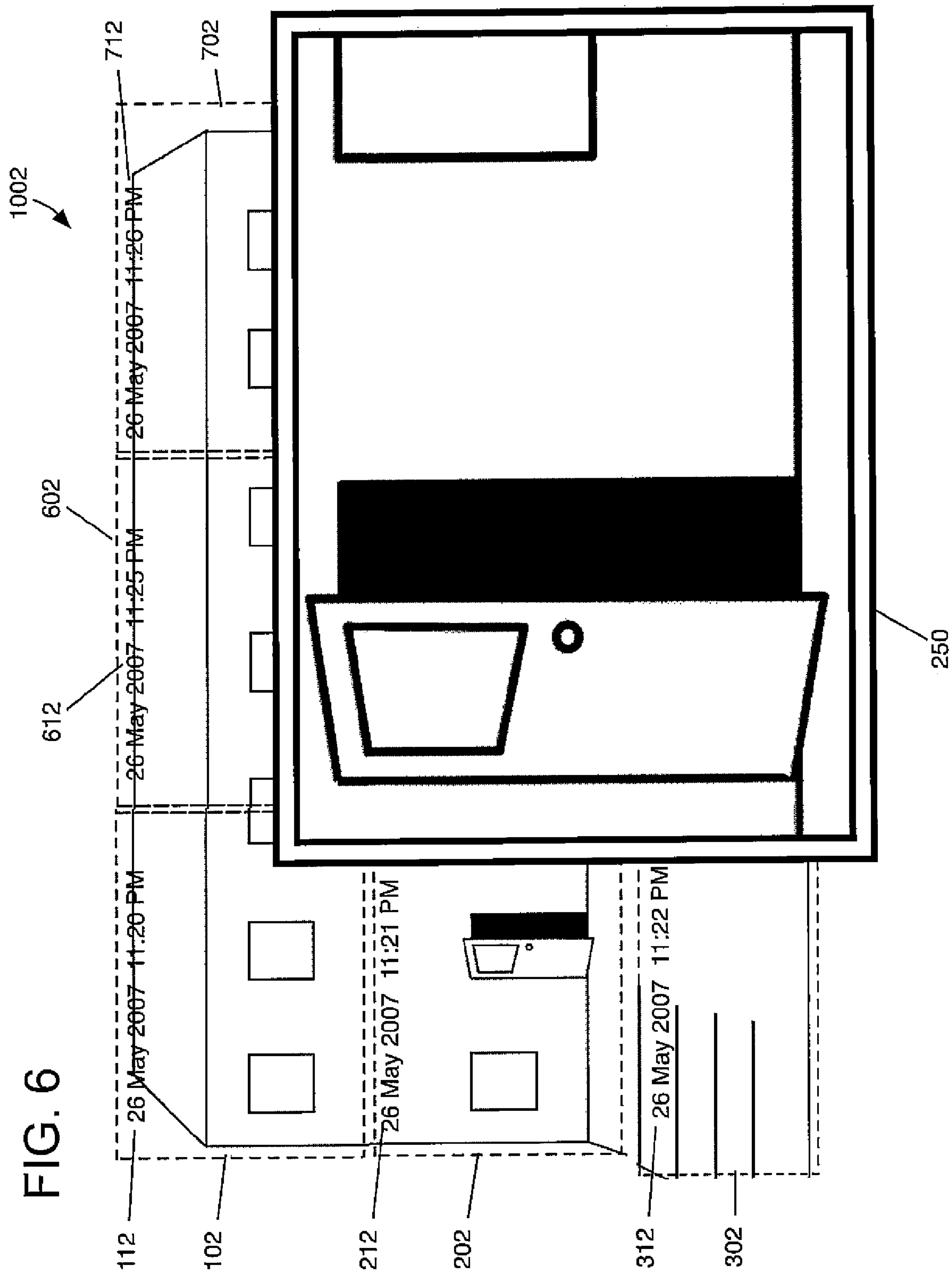
FIG. 6 shows the mosaic of FIG. 5 with an additional real-time image of one point of the area of FIG. 1.

FIG. 6 shows yet another alternative embodiment of the invention, wherein selecting an image (e.g., image 202) results in a user being presented with a detailed (e.g., zoomed) view of the image, or, alternatively, a live image 250 of the point represented in the image. In other embodiments, a user may be presented with an image sequence of past captured images of the point or with a past video sequence of the point. In other embodiments, upon selecting an image, a user may be presented with historical or summary data regarding earlier-captured images. For example, a user may be presented with statistics related to earlier analyses of images of the point (e.g., how often the door was open or closed, how often a lock was locked or unlocked, etc.). Such statistics may be presented in any number of forms, such as text or a graphical display.

Figure 7:
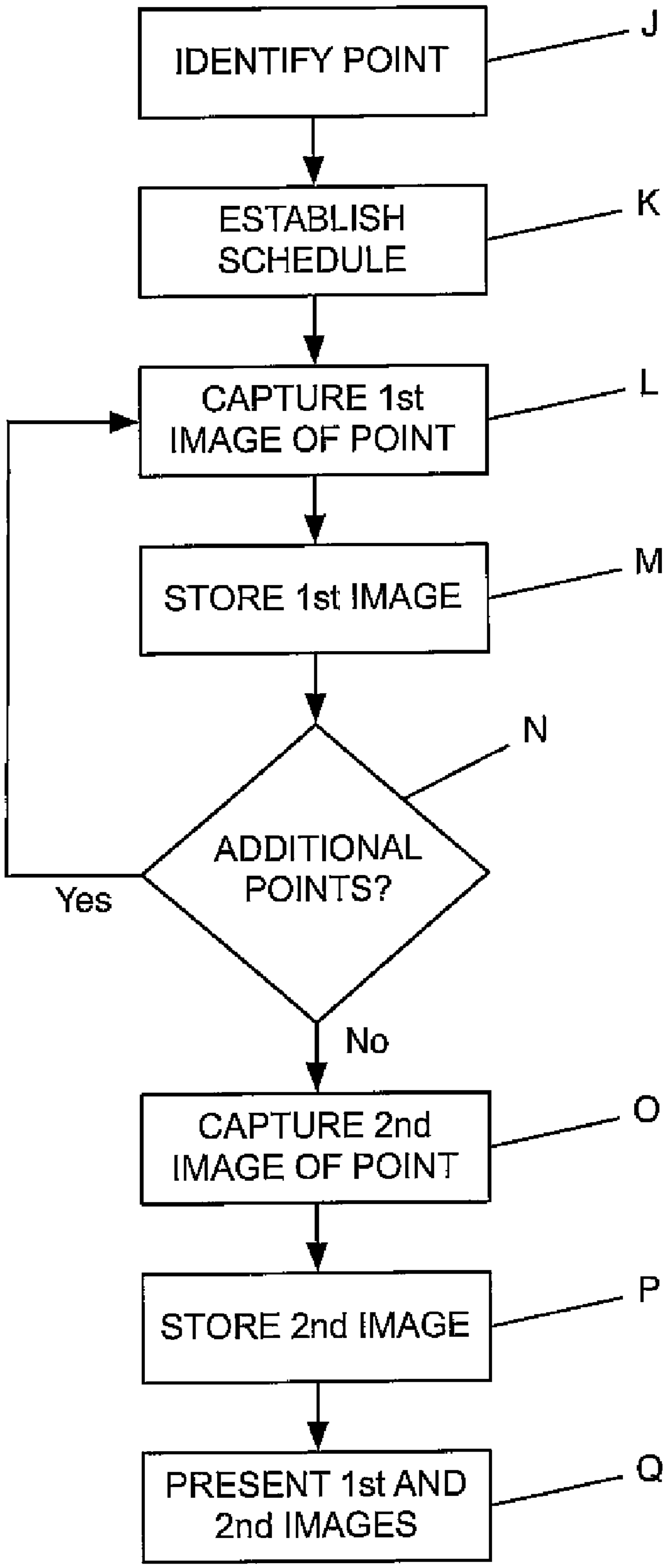
FIG. 7 shows a flow diagram of an illustrative method according to the invention.

FIG. 7 shows a flow chart of an illustrative method according to the invention. At J, a point to be surveyed is identified. At K, a schedule at which the point will be surveyed is established. A first image of the point is captured at L and stored at M.

At N, it is determined whether additional points have been identified. If so (i.e., "Yes" at N), L and M may be looped for each additional point. If not (i.e., "No" at N), a second image of the point is captured and stored at O and P, respectively. Finally, at Q, the first and second images captured at L and O are presented. As described above, the images may be presented in any number of ways, including, for example, a mosaic or an image sequence. If only a single point is to be surveyed, the first and second images would likely be presented as an image sequence. Alternatively, if more than one point is to be surveyed, the first and second images may be presented as components of mosaics.

Figure 8:
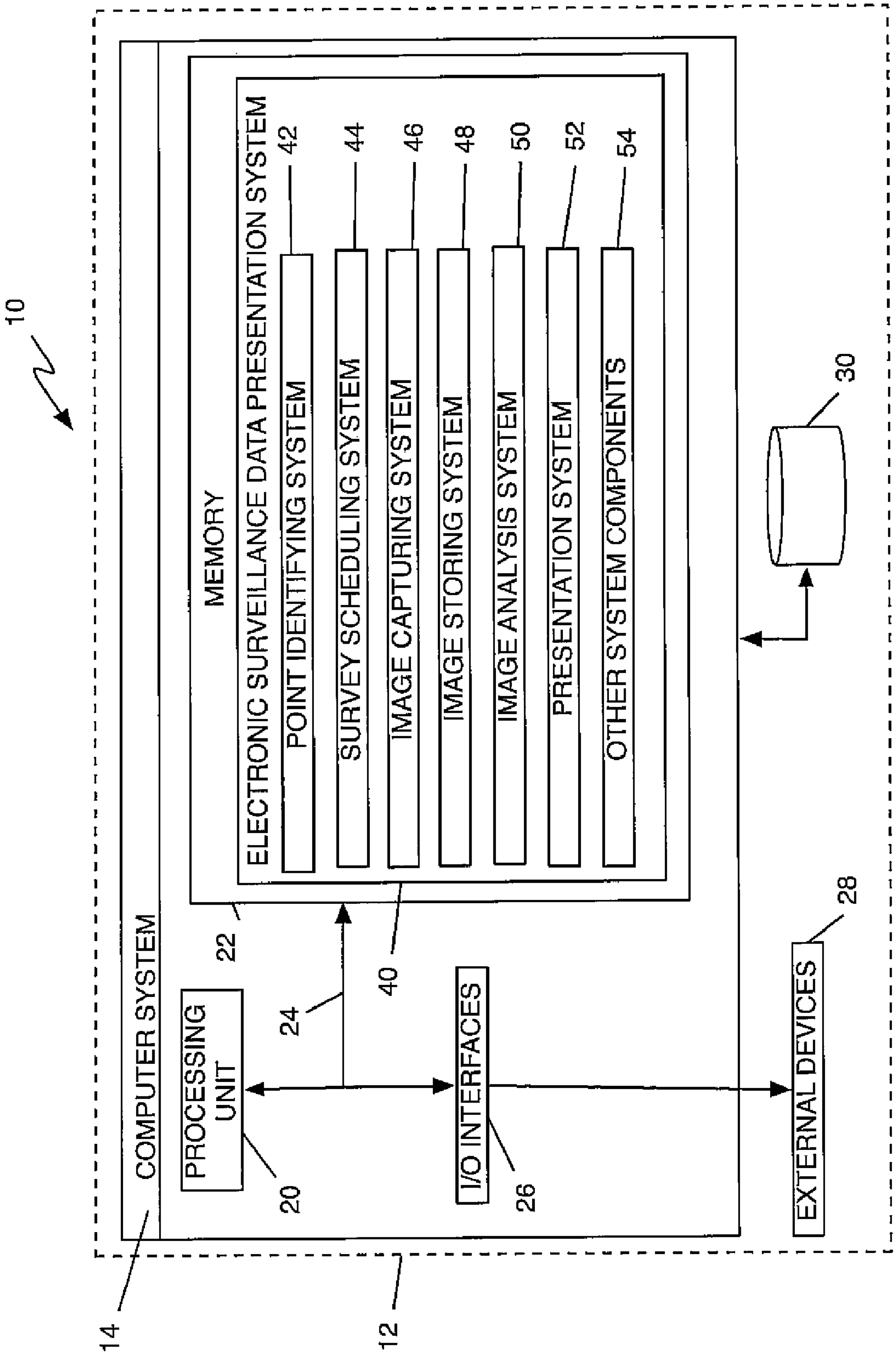
FIG. 8 shows a block diagram of an illustrative system according to the invention.

FIG. 8 shows an illustrative system 10 for presenting electronic surveillance data. To this extent, system 10 includes a computer infrastructure 12 that can perform the various process steps described herein for presenting electronic surveillance data. In particular, computer infrastructure 12 is shown including a computer system 14 that comprises an electronic surveillance data presentation system 40, which enables computer system 14 to present electronic surveillance data by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as electronic surveillance data presentation system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and electronic surveillance data presentation system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, electronic surveillance data presentation system 40 enables computer system 14 to present electronic surveillance data. To this extent, electronic surveillance data presentation system 40 is shown including a point identifying system 42, a survey scheduling system 44, an image capturing system 46, an image storing system 48, an image analysis system 50, and a presentation system 52. Operation of each of these systems is discussed above. Electronic surveillance data presentation system 40 may further include other system components 54 to provide additional or improved functionality to electronic surveillance data presentation system 40. It is understood that some of the various systems shown in FIG. 8 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for presenting electronic surveillance data, it is understood that the invention further provides various alternative embodiments. For example, in one embodiment, the invention provides a computer-readable medium that includes computer program code to enable a computer infrastructure to present electronic surveillance data. To this extent, the computer-readable medium includes program code, such as electronic surveillance data presentation system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to present electronic surveillance data as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for presenting electronic surveillance data. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of presenting electronic surveillance data comprising:

identifying a point to be surveyed;

establishing a schedule at which the point will be surveyed;

capturing a first image of the point according to the schedule;

storing the first image;

capturing a second image of the point according to the schedule;

storing the second image;

highlighting a difference between the first and second images; and presenting to a user the first image and the second image, including a zoomed view of the highlighted difference.

2. The method of claim 1, further comprising:

presenting to a user a live image of the point.

3. The method of claim 1, wherein identifying includes specifying coordinates in a camera's field of view.

4. The method of claim 1, further comprising:

identifying an additional point to be surveyed;

establishing an additional schedule at which the additional point will be surveyed;

capturing a first image of the additional point according to the additional schedule; and presenting the first images of the point and the additional point to a user.

5. The method of claim 4, wherein presenting includes constructing a mosaic including the first images of the point and the additional point.

6. The method of claim 4, further comprising:

storing the first image of the additional point;

capturing a second image of the additional point according to the additional schedule;

storing the second image of the additional point; and presenting the second images of the point and the additional point to a user.

7. A system comprising:

at least one computing device for presenting electronic surveillance data by performing a method comprising:

identifying points to be surveyed;

establishing a schedule at which the points will be surveyed;

capturing a first image and a second image of a first point according to the schedule;

storing the first image and the second image;

highlighting at least one difference between the first image and the second image; and presenting to a user the first image and the second image, including a zoomed view of the at least one highlighted difference.

8. The system of claim 7, wherein the method further comprises:

presenting to a user a live image of the point.

9. The system of claim 7, wherein capturing includes capturing using at least one pan-tilt-zoom (PTZ) camera.

10. The system of claim 7, wherein presenting includes presenting an image of the first point and the image of the second point in a mosaic.

11. A non-transitory computer-readable medium containing a program product, which when executed, causes a computer system to present electronic surveillance data by performing a method comprising:

identifying a point to be surveyed;

establishing a schedule at which the point will be surveyed;

capturing a first image of the point according to the schedule;

storing the first image;

capturing a second image of the point according to the schedule;

storing the second image;

highlighting a difference between the first and second images; and presenting to a user the first image and the second image, including a zoomed view of the highlighted difference.

12. The non-transitory computer-readable medium of claim 11, wherein the method further comprises:

program code for presenting to a user a live image of the point.

13. The non-transitory computer-readable medium of claim 11, wherein the method further comprises:

identifying an additional point to be surveyed;

establishing an additional schedule at which the additional point will be surveyed;

capturing a first image of the additional point according to the additional schedule; and presenting the first images of the point and the additional point to a user.

14. The non-transitory computer-readable medium of claim 13, wherein the program code for presenting includes program code for constructing a mosaic including the first images of the point and the additional point.

15. The non-transitory computer-readable medium of claim 13, wherein the method further comprises:

program code for storing the first image of the additional point;

program code for capturing a second image of the additional point according to the additional schedule;

program code for storing the second image of the additional point; and program code for presenting the second images of the point and the additional point to a user.

16. A method for deploying an application for presenting electronic surveillance data, comprising:

providing a computer infrastructure being operable to:

identify a point to be surveyed;

establish a schedule at which the point will be surveyed;

capture a first image of the point according to the schedule;

store the first image;

capture a second image of the point according to the schedule;

store the second image;

highlight a difference between the first image and the second image; and present to a user the first image and the second image, include the highlighted difference.

17. The method of claim 16, wherein the computer infrastructure is further operable to:

identify an additional point to be surveyed;

establish an additional schedule at which the additional point will be surveyed;

capture a first image of the additional point according to the additional schedule; and present the first images of the point and the additional point to a user.

* * * * *